US008848930B2

(12) United States Patent
Lundin

(10) Patent No.: US 8,848,930 B2
(45) Date of Patent: Sep. 30, 2014

(54) ADAPTIVE RING LEVEL

(75) Inventor: Magnus Lundin, Bromma (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 1307 days.

(21) Appl. No.: 12/186,570

(22) Filed: Aug. 6, 2008

(65) Prior Publication Data

US 2010/0034395 A1 Feb. 11, 2010

(51) Int. Cl.
*H03G 3/20* (2006.01)
*H04M 19/04* (2006.01)

(52) U.S. Cl.
CPC .................................. *H04M 19/044* (2013.01)
USPC .............................. 381/57; 381/107; 455/567

(58) Field of Classification Search
None
See application file for complete search history.

(56) References Cited

U.S. PATENT DOCUMENTS

| 6,044,279 A * | 3/2000 | Hokao et al. ............. 455/567 |
| 6,246,761 B1 * | 6/2001 | Cuddy ..................... 379/418 |
| 7,496,352 B2 * | 2/2009 | Kaminsky et al. ......... 455/412.2 |
| 8,036,391 B2 * | 10/2011 | Cronin ..................... 381/57 |
| 8,270,621 B2 * | 9/2012 | Hardee et al. .............. 381/56 |
| 8,442,595 B2 * | 5/2013 | Glebe ...................... 455/567 |
| 8,498,675 B2 * | 7/2013 | Huang ..................... 455/567 |

FOREIGN PATENT DOCUMENTS

| DE | 100 39 211 A1 | 2/2002 |
| GB | 2 313 978 A | 12/1997 |
| WO | WO 99/05850 | 2/1999 |

OTHER PUBLICATIONS

Written Opinion of the International Searching Authority and Patent Cooperation Treaty International Search Report corresponding to PCT/EP2009/051407 dated May 19, 2009, 9 pages.

* cited by examiner

*Primary Examiner* — Benjamin Sandvik
(74) *Attorney, Agent, or Firm* — Harrity & Harrity, LLP

(57) ABSTRACT

A method and an arrangement for adapting an alert signal level generated by a device to an ambient of the device is provided. The method may include processing a sound signal corresponding to a test signal or an alert signal, generating a correlation value by correlating the sound signal with a generated sound signal, comparing the correlation value with a value, and adjusting the alert signal to a level based on result of the comparison.

12 Claims, 4 Drawing Sheets

ADAPTIVE RING LEVEL

TECHNICAL FIELD

The present invention relates generally to a method and device for generating ringer signal in a communication device and, more particularly, an adaptive ringer signal.

BACKGROUND

Communication devices, such as cellular telephones, have become increasingly versatile. For example, cellular telephones today often include applications that allow users to do more than just make and receive telephone calls, such as send/receive text messages, play music, play video games, take pictures, etc. As a result, cellular telephones have become an increasingly common part of every day life for a large number of users.

As a common part of every day life, cell phones are transported on one's person in some way. Typically, a cell phone is carried in a packet, a handbag, a case, a tote bag, or in a specially designed cover.

Moreover, having the cell phone carried around implies that it is often used in noisy environments. A problem arises when a wireless device such as a cellular phone and/or wireless pager device that is in a noisy environment rings or is otherwise activated with an incoming call/message, etc. The user of the ringing or beeping wireless device may not hear the tone at all or timely enough to respond to it.

Most cell phones include mechanisms for adjusting a loudness of a ringer. Some devices provide user interfaces for defining multiple signalling profiles, where each profile specifies a function that the ringing device and/or the vibrating device are to exhibit upon detection by the phone handset of an incoming call/message. A user of such devices can manually select the appropriate signalling profile in accordance with the user's immediate physical environment (e.g., ambient noise level).

One way of alerting the cell phone user is using a variable level for a ring tone or other alerting signals. An easy way to have adaptive level for sound output, e.g., ringer, alarm etc., is to check the input level of the microphone, i.e., if background noise level is high, then high level for audible ring; and if background noise level is low, then low level for audible ring. However, this technique does not work very well when the device is carried in a pocket, bag, or similar carrier, where the detected input noise level would be determined to be quiet but a low level audible level would not be heard by the user due to the muffling effect of the carrier.

SUMMARY

A need exists for an alerting system that appropriately handles announcement of, for example, incoming calls, without requiring a user to manually adjust sound level settings. The inventors have discovered that this can be achieved by determining a coupling quality between the microphone and the speaker of the device. That is, the input level is likely to be low and the coupling bad when the device is carried in, for example, a pocket of the user's clothes.

It is thus desirable to implement a system in which the device having an alert signal generator could detect the environment in which of the device is carried, whereby the audible output level of the alerter can be raised accordingly to increase the likelihood of being heard by the user and unheard alerts and/or missed calls can be avoided.

The intelligent audible-varying system is enabled using acoustic coupling to detect the user case when the device is in a pocket or similar sound-absorbing environment.

According to a first aspect of the invention, a method is provided for adapting an alert signal level generated by a device to an ambient of the device. The method may include processing a sound signal corresponding to a test signal or an alert signal, generating a correlation value by correlating the sound signal with a generated sound signal, comparing the correlation value with a value, and adjusting the alert signal to a level based on result of the comparison. For example, the sound signal may be received by a microphone and the test signal may be generated by a speaker or a ringer. For example, the correlation value may be a correlation between the microphone and the speaker.

The method may be used to detect ambient which may be an environment made of a material which damps the sound signal, e.g., the material may be a fabric and/or a textile.

According to a second aspect of the invention, a method is provided for adapting an alert signal level generated by a device to an ambient of the device. The method may include activating an alert, activating a microphone, picking up the sound by the microphone, checking the sound level: if high sound level: generate a loud alert, if low sound level: generating a test or alert signal, check the correlation between the speaker output and microphone input, if low correlation: increasing output sound level, if high correlation: generate the alert at that level, if very high correlation: decrease the sound output level.

According to a third aspect of the invention, a method is provided for adapting an alert signal level generated by a device to an ambient of the device. The method may include activating an alert, generating a sound by a speaker or ringer, activating a microphone, picking up the sound by the microphone, checking the sound level: if high sound level: generating a loud alert, if low sound level: generating a test or alert signal, gradually increasing the sound level until a good level of correlation is reached.

The invention also relates to an arrangement for adapting an alert signal level generated by a device to an ambient of the device. The arrangement may include a processing unit for processing a sound signal corresponding to a test signal or an alert signal, means for generating a correlation value by correlating the sound signal with a generated sound signal, means for comparing the correlation value with a predetermined value, and means for adjusting the alert signal to a level based on result of the comparison. The device may further include a microphone for receiving the sound signal. The device may further include a speaker or a ringer for generating the test signal. The correlation value may be correlation between the microphone and the speaker.

The invention also relates to a mobile communication terminal including an antenna for receiving/transmitting RF signals as between the terminal and a cell site antenna of a wireless/cellular telecommunications network, a transceiver associated with the antenna for processing incoming and outgoing signals, call processing components for controlling operation of the terminal, and user interface components for providing an interface between the terminal and a user. The mobile communication terminal may further include an arrangement for adapting an alert signal level generated by the mobile communication terminal to an ambient of the terminal. The arrangement may include a processing unit for processing a sound signal corresponding to a test signal or an alert signal, means for generating a correlation value by correlating the sound signal with a generated sound signal, means for comparing the correlation value with a value, and means for adjusting the alert signal to a level based on a result of the comparison.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

Figure 1:
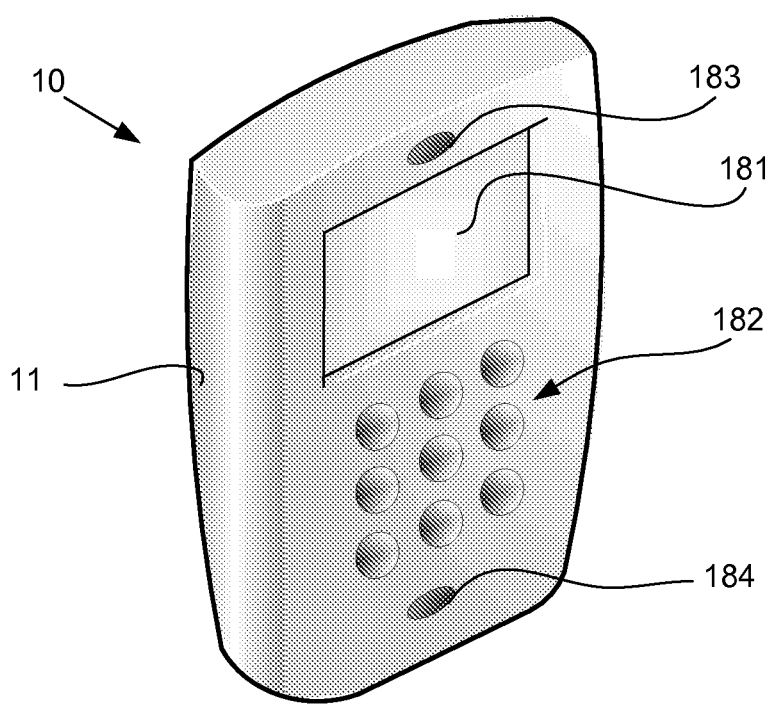
FIG. 1 is a perspective view of a portable telephone in connection with which the present invention can be used.

A "device," as the term is used herein, is to be broadly interpreted to include any portable device having a microphone and a speaker, such as radiotelephone; a personal communications system (PCS) terminal that may combine a cellular radiotelephone with data processing; a personal digital assistant (PDA) that can include a radiotelephone, a pager, an Internet/intranet access device, a web browser, an organizer, a calendar, a camera (e.g., video and/or still image camera), a sound recorder, and/or a global positioning system (GPS) receiver; a GPS device; a camera (e.g., video and/or still image camera); a sound recorder; and any other computation or communication device capable of displaying media, etc.

In the following, the invention is described in an exemplary way with reference to a cell phone.

When operated in an environment with a high background noise, it can be difficult to hear a device ring or any other alert signals rendered by the device. With ordinary adaptive ringer level techniques, the output level is typically adjusted depending on the detected noise level. This will increase the ringer level when the noise is high (high input on microphone) and decrease it in a silent environment (low input on microphone). This does not work very well when the phone is stowed in a pocket, handbag, or similar compartment (as is typical). In this circumstance, the input to the microphone will be quite low—due to the muting effect of the compartment—which indicates a quiet environment. Therefore the output (ringer or alarm) will be set to low when it actually should be high, since much of the audible output is likely to be absorbed by the material of the ambient carrying item, e.g., fabric, textile, etc. Table 1 illustrates the relation between the input, the environment, and the ringer level for a cell phone.

TABLE 1

| Input | High | Low |
|---|---|---|
| Environment | Noisy | Quiet OR Blocked Microphone |
| Ringer Level | High | High or Low? |

Embodiments of the invention provide a resolution for the uncertainty with respect to the Ringer Level for Low Input by monitoring the cross-correlation (correlation or coupling) between the speaker and the microphone. Generally, the cross-correlation is a measure of similarity of two signals, commonly used to find features in an unknown signal by comparing it to a known signal or standard. Cross-correlation may be a function of, for example, the relative time between the signals.

When the cell phone is lying on a hard, flat surface in a quiet room, for example, the correlation between the speaker and the microphone may be very good (this correlation may also be used for echo cancellation during speaker phone mode). When the phone is carried in a pocket or something else made out of fabric or the like, i.e., media with good sound-absorption properties, like a handbag, the correlation will be inferior since the microphone and/or the loudspeaker is likely to be blocked and/or damped. Table 2 illustrates the relation between the input, the correlation, the environment, and the ringer level for a cell phone.

TABLE 2

| Input | High | High | Low | LOW |
|---|---|---|---|---|
| Correlation | Good | Bad | Good | BAD |
| Environment | Noisy | Noisy | Quiet, not blocked | BLOCKED/DAMPED |
| Ringer level | High | High | Low | HIGH |

Figure 3:
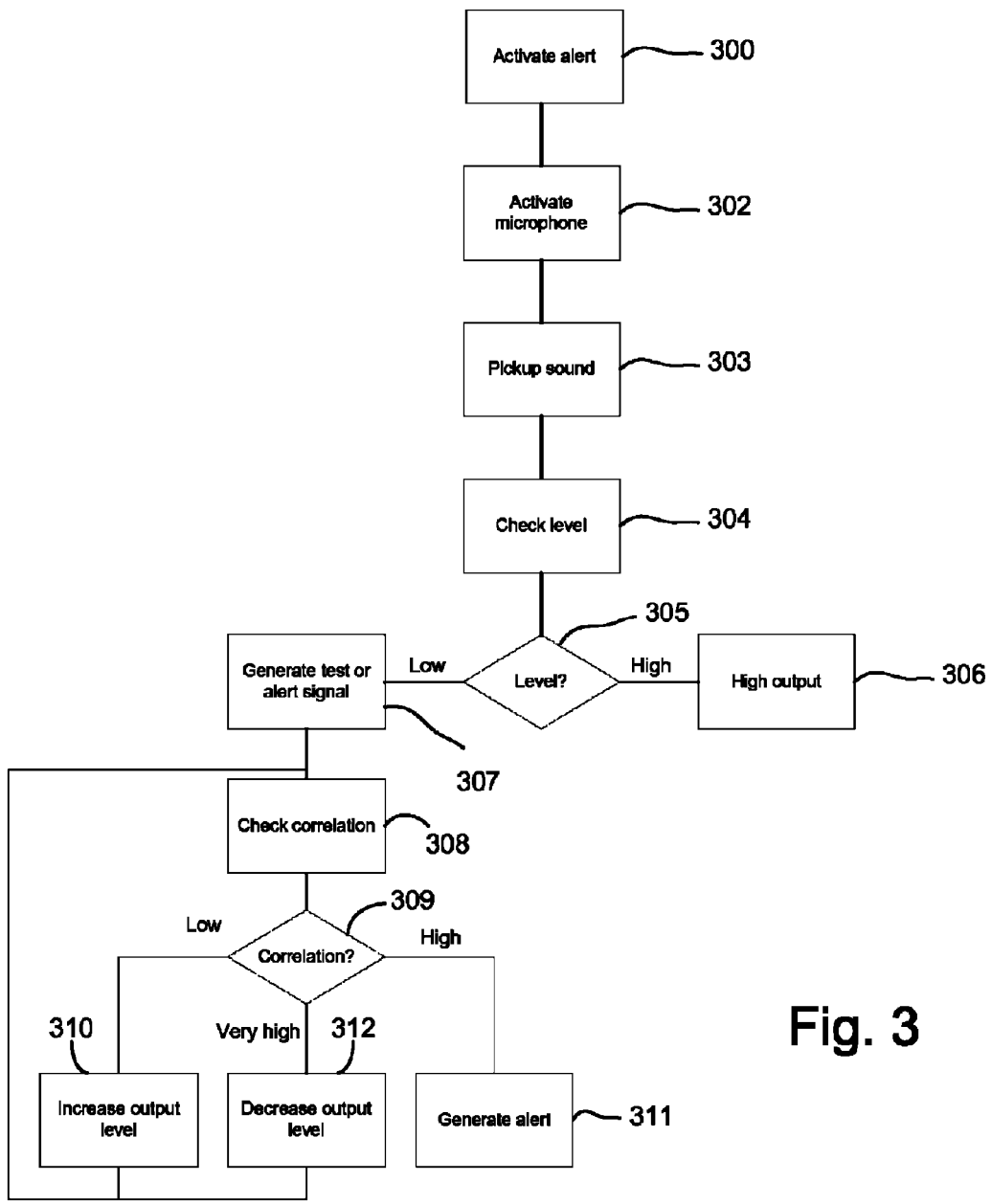
FIG. 3 is a flow chart showing an alert signal level adapting process in accordance with the present invention.
Figure 4:
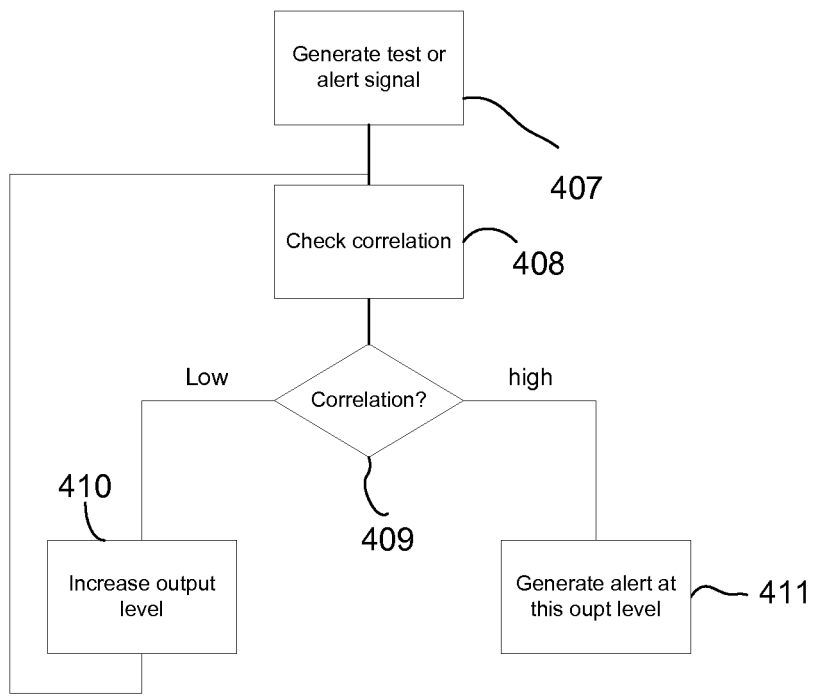
FIG. 4 is a flow chart showing an alert signal level adapting process in accordance with another embodiment of the present invention.

The correlation check can be carried out while a sound (ring tone, alarm signal, or similar audible output) is generated. One method according to the invention, as illustrated in FIG. 3, comprises the steps of:

Activating an alert (300),
Activating the microphone (302),
Pickup of the sound (303) by the microphone (background sound is picked up),
Checking (304) the sound level:
If (305) high level:
    Generating (306) a loud alert
If (305) low level:
    Start generating (307) a test or alert signal
Checking (308) the correlation between (loudspeaker) output and (microphone) input
    If (309) low correlation:
        Increasing (310) output level
    If (309) high correlation:
        Generating (311) alert at that level
    If (309) very high correlation:
        Decreasing (312) output level
Looping back and rechecking (308) correlation Alternatively, as illustrated in FIG. 4, one embodiments includes starting (407) to generate the signal at low level and then gradually increasing (410) the level of the signal until a good level of correlation is reached. Other steps may relate to same steps as method of FIG. 3.

The above-described process may either be performed from the start or during the entire time that the alert signal is played, following steps 308-312, with step 311 looped back without a change in output level. When the device is removed from the pocket or bag, an iteration of the process may result in a lowering of the audible output level.

Figure 2:
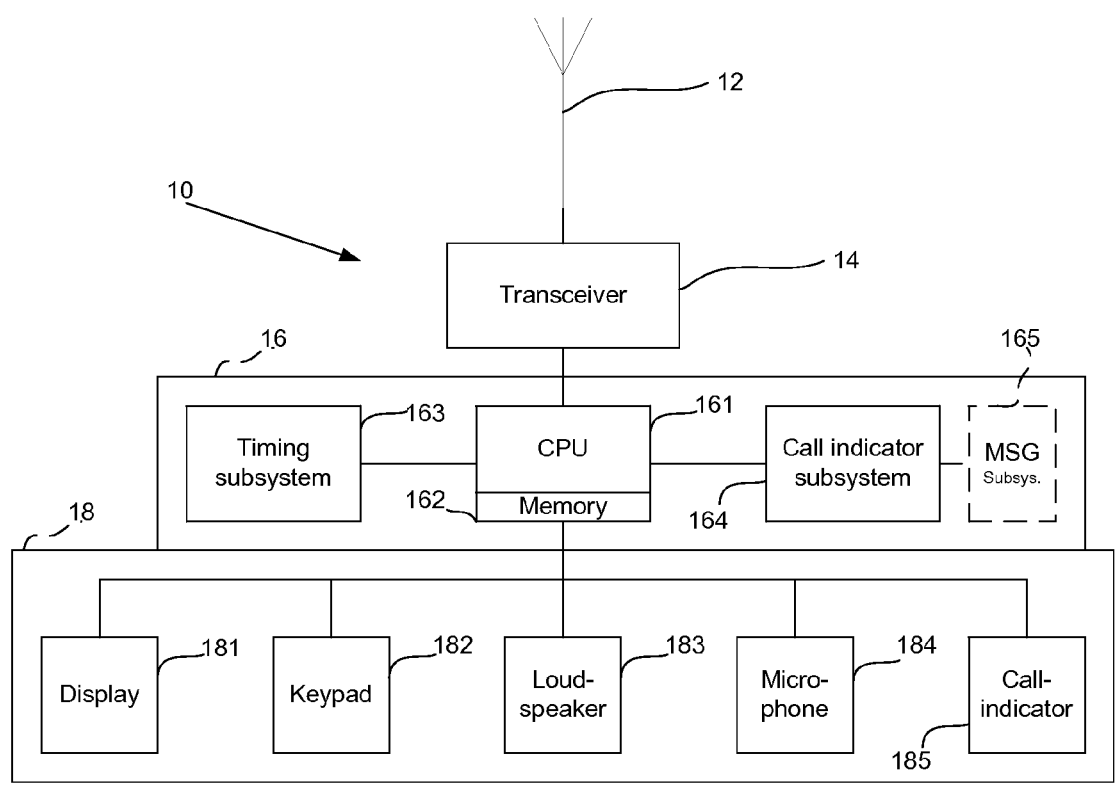
FIG. 2 is a schematic diagram of a portable telephone system in accordance with the present invention.

Referring to FIGS. 1 and 2, a mobile communication terminal system or handset (cell phone) 10 is illustrated. Generally, handset 10 may include a housing 11, including an antenna 12 for receiving/transmitting RF signals between handset 10 and a cell site antenna of a wireless/cellular telecommunications network; transceiver 14 associated with antenna 12 for processing incoming and outgoing signals, call processing components 16 for controlling operation of handset 10, and user interface components 18 for providing an interface between handset 10 and the user.

Transceiver 14 may include an incoming signal processing unit and an outgoing call processing unit (not shown). The incoming signal processing unit may perform a number of functions related to an incoming call signal, including filtering the incoming signal to remove unnecessary wavelength bands, demodulating the high frequency carrier signal, and converting the signal into a digital format for processing by call processing component 16. The outgoing call processing unit may perform a number of functions related to transmitting a signal including processing a voice or other signal for transmission, synthesizing the communication signal to apply a reference frequency, modulating the communication signal into a high frequency carrier signal, and filtering the resulting signal for transmission.

Call processing components 16 may include a processor (CPU) 161 and a memory and I/O unit 162, a timing subsystem 163, a call indicator control subsystem 164, and an optional messaging subsystem. Operation of timing system 163, control system 164, and the messaging system will be described in more detail below. Processor 161 may control operation of the various components of handset 10.

In this regard, processor 161 may receive an incoming signal from the incoming signal processing unit, and notify the subscriber of the incoming call. Processor 161 may communicate with cell site/switch equipment via outgoing call processing unit 16 and antenna 12 to establish a channel for communication as between handset 10 and a calling device that originated the incoming call signal. With respect to outgoing calls, processor 161 may receive information from user interface components 18, e.g., a phone number and transmit signal, communicate with cell site/switch equipment via transceiver 14 and antenna 12 to establish a communications channel, transmit a call request, and wait for a response from the called telephone/network. During a phone conversation, processor 161 may receive voice communications from user interface components 18, transmit the voice communications, receive incoming signals, transmit voice communications to user interface components 18, and detect any operating signals such as a hang up signal.

User interface components 18 may include a number of devices for communicating with the subscriber. A display 181 may provide a visual presentation of a phone number entered by the user, information regarding an incoming call and/or various operating information such as status of handset's 10 battery. A keypad 182 may include buttons corresponding to the numbers 0-9 for entering phone numbers or other numerical information as well as various other buttons such as "end", "off", "#", "*", "flash", "send", or other buttons. An ear piece 183 or a loudspeaker may receive communication information from processor 161 and provide audio signals to the subscriber. A microphone 184 may receive voice and/or other audio signals from the subscriber and provides corresponding communication signals to processor 161. Finally, a call indicator 185 may provide a signal to the subscriber that notifies the subscriber of an incoming call. For example, call indicator 185 may be a ringer and/or other device for rendering an audio indication, a vibrator, or any other device which provides a signal that is perceptible by the subscriber. Loudspeaker 183 may be part of and/or connected to call indicator 185. Moreover, call indicator 185 may also be used for generating other alert signals, such as alarm signals.

Call indicator 185 and/or keypad 182 may include a temporary ringer silencer input key and answering input key, timing subsystem 163, processor 161, control subsystem 164, and optional messaging subsystem may be of particular use with respect to understanding the adapted alert level control system of the present invention. In the active indicator mode, upon receiving an incoming call signal, processor 161, in cooperation with control subsystem 164, may activate call indicator 185 to notify the subscriber of the incoming call. Call indicator 185 may be activated throughout the time period between receipt of the incoming call signal (or output of an alert signal) and receipt of an answering input signal from keypad 182. Upon receiving the call, processor 161 may activate call indicator 185 and/or loudspeaker 183 and microphone 184. The sound generated may be picked up with microphone 184. The signal from microphone 184 may be analysed by processor 161, by which a level of microphone 184 may be checked, and when it is determined to be low, the cross-correlation between microphone 184 input and loudspeaker 183 output signals may be calculated according to the process described earlier. If the level of microphone 184 is determined to be low, the signal may be generated at a corresponding low level. If the correlation is bad, the level of the alert signal may be gradually increased until the correlation is good enough which indicates that the output is loud enough. Predefined levels of correlation may be stored in memory 162, which may be used as a lookup table for processor 161.

In the case of a ringer, the ringer may sound periodically throughout the above-mentioned answering time period. If an answering input is not received within a given time, as measured by reference to timing subsystem 163, processor 161 may transmit a hang-up or other signal by which the calling telephone is notified that the subscriber is unavailable.

In a further implementation, the user may select, e.g., by a keystroke or menu entry, a deactivation prior to receipt of an incoming call to preset handset 10 for temporarily inactive mode operation. In this regard, processor 161 may control handset's 10 ringer to provide a single ring or an abbreviated "ping" ring, after which the ringer will remain silent until the call is answered or the time for answering expires.

According to one embodiment of the invention, one or more of alert signals, e.g., related to alarm, received Short Messages Services (SMS), Multi-Media Messages Services (MMS), e-mails, etc., may implement the method of the invention. In this case, when a message is received by message subsystem 165, processor 161 may be notified, which may generate a test tone through speaker/call indicator 184/185 and pick up the response using microphone 183, and look up for the correlation for adaptive signal level as described above.

In one additional embodiment, processor 161 may carry out periodical tests by generating a sound and picking it up the sound with microphone 183 to determine the ambient noise.

The principles of the invention may be used for any product that may make use of the quantitative and/or qualitative information of the sound-absorption properties of an ambient medium associated with a stowed device to determine whether the device is currently disposed in a sound-absorbing material (e.g., fabric). A small loudspeaker and a small microphone could be attached on products solely for the purpose of making this determination.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

What is claimed is:

1. A method of adapting an audible level of an alert signal that is generated by a device, the method comprising:
 periodically generating, by the device, the alert signal;
 processing, by the device, a sound signal corresponding to the alert signal;
 generating, by the device and concurrently with the periodic generation of the alert signal, a test signal, that is different than the alert signal, based on processing the sound signal;
 correlating, by the device, the test signal with another sound signal to generate a correlation value,
  the other sound signal corresponding to the test signal;
 comparing, by the device, the correlation value to a stored value; and
 adjusting, by the device and during the periodic generation of the alert signal, an output level of the alert signal based on a result of the comparison.

2. The method of claim 1, wherein the sound signal is received by a microphone of the device.

3. The method of claim 2, wherein the alert signal is generated by a speaker or a ringer of the device.

4. The method of claim 3, wherein the correlation value relates to a correlation between the microphone and the speaker.

5. The method of claim 1, wherein the alert signal is generated to an ambient environment of the device that is made of a sound-damping substance.

6. The method of claim 5, wherein the sound-damping substance comprises at least one of a fabric or a textile.

7. A method of controlling an audible signal level generated by a device, the method comprising:
 periodically rendering, by the device, an alert sound;
 receiving, by the device, the alert sound at a microphone of the device;
 comparing, by the device, a sound level of the received alert sound to a sound level of the rendered alert sound, wherein
  when a result of the comparison indicates that a high sound level exists, the device is configured to generate a loud alert signal, and
  when the result indicates that the high sound level does not exist, the method further comprises:
   generating, by the device and concurrently with the periodic rendering of the alert sound, a test signal that is different than the alert sound, based on comparing the sound level of the received alert sound to the sound level of the rendered alert sound;
 receiving, by the device, the test signal at the microphone; and
 determining, by the device, a correlation between the generated test signal and the received test signal, wherein:
  when the correlation comprises a first correlation level, the device is configured to increase, during the periodic rendering of the alert sound, a sound level of the alert sound,
  when the correlation comprises a second correlation level, the device is configured to increase, during the periodic rendering of the alert sound, a sound level of the alert sound, and
  when the correlation comprises a third correlation level, the device is configured to decrease, during the periodic rendering of the alert sound, a sound level of the alert sound.

8. A method of adapting an alert signal level generated by a device, the method comprising:
 activating, by the device, an alert;
 periodically generating a sound by an audio output device;
 activating, by the device, a microphone;
 receiving, by the device, the sound at the microphone; and
 checking, by the device, a sound level of the received sound, wherein:
  when the sound level exceeds a threshold value, the method further comprises generating the alert,
  when the sound level does not exceed the threshold value, the method further comprises:
   generating, concurrently with the periodic generation of the sound, a test signal that is different than the sound,
   receiving the test signal at the microphone, and
   gradually increasing, during the periodic generation of the sound, a sound level of the test signal until a predetermined level of correlation between the generated test signal and the received test signal is detected.

9. A system for adapting an audio level of an alert signal generated by a device, the system comprising:
 means for processing a sound signal corresponding to a periodically generated alert signal;
 means for generating a correlation value,
  the means for generating the correlation value including means for correlating the sound signal with another sound signal that is different than the alert signal and that is generated concurrently with the periodic generating of the alert signal;
 means for comparing the correlation value with a value; and
 means for adjusting, during the periodic generation of the alert signal, an output level of the alert signal based on result of the comparison.

10. The system of claim 9, further comprising means for receiving the sound signal.

11. The system of claim 10, further comprising means for generating the test signal.

12. The system of claim 11, wherein the correlation value is a correlation between the sound signal and the test signal.

* * * * *